E. W. MIKAELSON.
ROLLER TABLE.
APPLICATION FILED JAN. 7, 1919.
1,371,322. Patented Mar. 15, 1921.
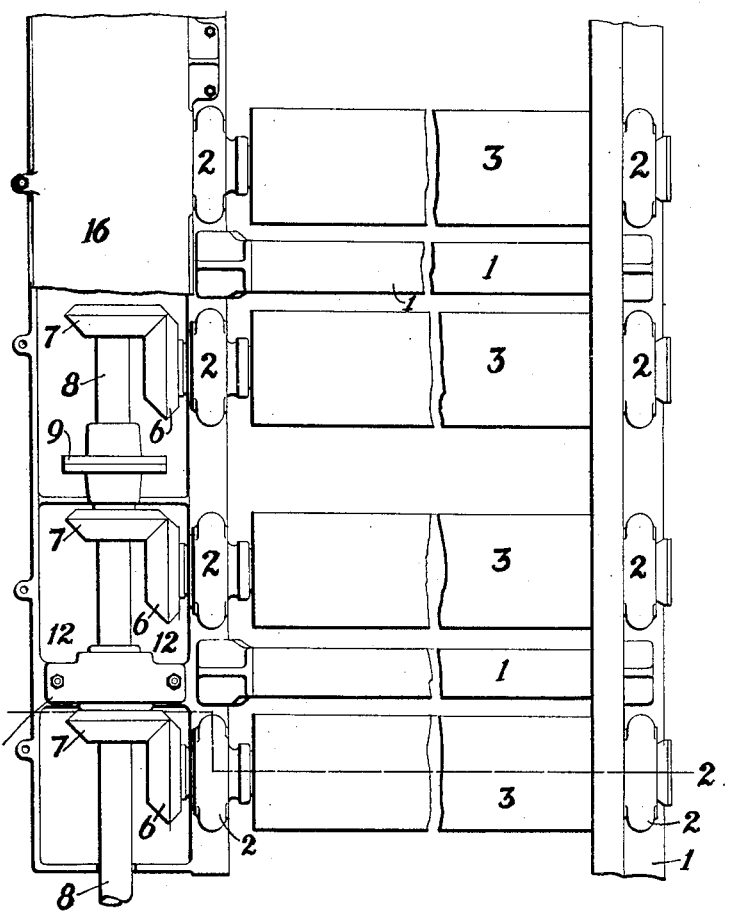
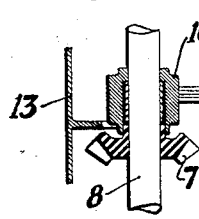
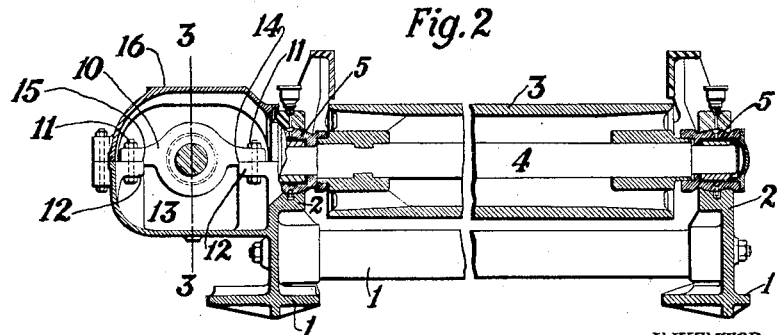
INVENTOR.
Eric W. Mikaelson,
BY J. Wooster
ATTORNEY ERIK W. MIKAELSON, OF EASTON, PENNSYLVANIA, ASSIGNOR TO TREADWELL ENGINEERING COMPANY, A CORPORATION OF PENNSYLVANIA.

ROLLER-TABLE.

1,371,322.

Specification of Letters Patent.

Patented Mar. 15, 1921.

Application filed January 7, 1919. Serial No. 270,094.

*To all whom it may concern:*

Be it known that I, ERIK W. MIKAELSON, a citizen of the United States, and a resident of Easton, in the county of Northampton and State of Pennsylvania, have invented certain new and useful Improvements in Roller-Tables, of which the following is a specification.

This invention relates to roller tables such as are used for feeding billets to a rolling mill, and has for its object to render the driving gear of such tables more easily assembled and disassembled. These roller tables generally comprise a large number of parallel rollers driven by a single line shaft through gearing, and considerable difficulty is encountered in the erecting shop in setting up this line shaft and in taking it out in case it is desired to replace a gear or to make some other repair. An ordinary horizontally split bearing is expensive to install and owing to the large number of bevel gears commonly employed on the line shaft for driving each roller, the removal of the bearing caps does not facilitate insertion or removal of the line shaft, because the thrust bearings still have to be removed. Again, it is preferable to distribute the thrust on the line shaft between several bearings rather than to provide a single heavy thrust bearing on one end of the line shaft.

By this invention, the line shaft bearings are of ring form and located behind one or more of the bevel gears on the line shaft so as to act as thrust bearings, and are furthermore so mounted on the frame that they can be unbolted and either lifted slightly or slid longitudinally so that the line shaft with its bevel gears can readily be disengaged from the bevel gears on the several rollers and lifted out as a unit. For convenience the line shaft may be divided into sections connected by separable couplings. The invention is of especial advantage in manufacturing and setting up a roller table since adjustments are unnecessary and bearings carrying the shaft cannot be fastened to the frame until every part is in proper position.

In the accompanying drawings,

Figure 1 is a plan view of a portion of a roller table embodying the invention,

Fig. 2 is a sectional view on the line 2—2 of Fig. 1, and

Fig. 3 is a vertical section on the line 3—3 of Fig. 2.

1 represents the frame of the machine carrying side bearing standards 2, 2 to receive the table rollers 3. Each roller is mounted on a shaft 4 carried in bearings 5, 5, and at one side each shaft 4 carries a bevel driven gear 6. These driven gears 6 are driven by driving gears 7 on the line shaft 8, which may be in sections provided with couplings 9. The shaft 8 is carried in ring bearings 10, which are separably secured by bolts 11 to lugs 12, the frame portions carrying the lugs 12 preferably constituting a trough 13 as shown. These lugs 12 constitute the supports for the bearings. The bearings 10 are preferably disposed adjacent to one or more of the driving gears 7 as shown in Fig. 1, so as to constitute thrust as well as supporting bearings, and are provided with recesses 14, 15, which are machined out to fit over machined portions of the lugs 12. The machined portions of the lugs, and the recesses of the bearings constitute alining surfaces which coöperate to hold the bearings and hence the shaft in alinement. The recesses 14, 15 are of slight depth, just sufficient so that when the nuts on bolts 11 are removed the bearings 10 can be pivoted so as to disengage the outer recess 15 from the outer lug 12 thereby enabling the whole shaft 8 with the bearings to be removed horizontally outwardly to the left until the teeth of gears 6 and 7 disengage. It is found that the ordinary back lash in the gears will permit the bearings to be lifted sufficiently so as to accomplish disengagement, it being seen that when the bearing rings are seated, the outer recess 15 takes the thrust against the outer lug 12. In case of a very heavy or long shaft, the bearings can be disengaged from the lugs by removing the bolts and sliding the bearings longitudinally on the shaft until the bearing recesses clear the lugs 12 whereupon the entire line shaft can be taken out as a unit. In assembling, the reverse operation can be effected, that is the bearings can be slid into place after the gears are partly engaged. 16 is a removable cover for the purpose of protecting the gears from heat and dirt, and the trough 13 will ordinarily contain the lubricating oil. The gear 7 will be keyed on the shaft 8 in the usual manner alternating with the bearing 10 and it will be a simple matter to fasten down the bearings after the gears are meshed with the assurance that the shaft will be properly lined up and the gears properly meshed.

The invention is shown applied to an approach table for a blooming mill but it will be understood that the invention is likewise applicable to tables for other mills, and generally wherever a plurality of parallel rollers or shafts are to be driven by a line shaft in such manner as to be readily attachable or detachable.

What is claimed, is:

1. In combination with a shaft carrying roll driving gears, a frame having spaced side members each having separated lugs at opposite sides respectively of the shaft for supporting the same, said lugs having finished surfaces, bearings for the shaft having finished surfaces to coöperate with the said lug surfaces to aline the bearings and shaft, and means for separably securing the bearings to the lugs.

2. The combination with a frame carrying a plurality of driven shafts, of a single driving shaft geared to each of the driven shafts, and bearings for the driving shaft separably secured to the frame in such manner that the shaft driving gears and bearings can be removed together, the bearings and frame supports having interlocking means to provide a predetermined alinement upon replacement.

3. In a roller table, the combination with a plurality of shafts for transmitting rotation to the table rolls, and a single driving shaft geared to each of said roll shafts, bearings for said driving shaft having alining surfaces, a frame provided with supports for said bearings, said supports having alining surfaces to coöperate with the alining surfaces of the bearings to hold said driving shaft in alinement and means for separably securing the bearings to the supports.

4. The combination in a roller table of a frame carrying a plurality of parallel rollers, a bevel driven gear for each roller, a line shaft having bevel driving gears meshing respectively with the driven gears, bearings for the line shaft fastened to the frame and means for separably interlocking the bearings with the frame and separable means to aline the gears thereby permitting removal of the line shaft with its gears and bearings when the bearings are unfastened and unlocked from the frame.

5. The combination in a roller table of a frame carrying a plurality of parallel rollers each having a driven gear, a line shaft carrying driving gears meshing with said gears, a pair of separated bearing supporting lugs having slight notches therein carried by the frame, ring bearings carried by said shaft and having notches coöperating with the notches in said lugs to interlock therewith to permit separation of the shaft, its gears and bearings as a unit and subsequent re-assembly of the shaft and gears in predetermined alinement.

Signed at Easton, in the county of Northampton and State of Pa., this 4th day of November, A. D. 1918.

ERIK W. MIKAELSON.